(12) United States Patent
Vise et al.

(10) Patent No.: US 11,268,438 B2
(45) Date of Patent: Mar. 8, 2022

(54) COMBUSTOR LINER DILUTION OPENING (71) Applicant: General Electric Company, Schenectady, NY (US)

(72) Inventors: Steven Clayton Vise, Loveland, OH (US); Allen Michael Danis, Mason, OH (US); Jayanth Sekar, Karnataka (IN); Pradeep Naik, Karnataka (IN); Perumallu Vukanti, Bangalore (IN); Arthur Wesley Johnson, Cincinnati, OH (US); Clayton Stuart Cooper, Loveland, OH (US); Karthikeyan Sampath, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 329 days.

(21) Appl. No.: 15/705,314

(22) Filed: Sep. 15, 2017

(65) Prior Publication Data

US 2019/0085767 A1 Mar. 21, 2019

(51) Int. Cl.
| | | |
|---|---|---|
| *F02C 3/22* | (2006.01) | |
| *F23R 3/00* | (2006.01) | |
| *F23R 3/04* | (2006.01) | |
| *F23R 3/06* | (2006.01) | |
| *F23R 3/16* | (2006.01) | |

(52) U.S. Cl.
CPC .............. *F02C 3/22* (2013.01); *F23R 3/002* (2013.01); *F23R 3/04* (2013.01); *F23R 3/06* (2013.01); *F23R 3/16* (2013.01); *F05D 2220/32* (2013.01); *F05D 2240/35* (2013.01); *F05D 2270/082* (2013.01)

(58) Field of Classification Search
CPC .... F23R 3/002; F23R 3/04; F23R 3/06; F23R 3/26; F23R 3/045; F23R 3/48; F23R 3/50; F23R 2900/030401; F23R 2900/03042; F23R 2900/030402; F02C 7/18; F05D 2240/325
See application file for complete search history.

(56) References Cited

U.S. PATENT DOCUMENTS

| | | | | |
|---|---|---|---|---|
| 3,134,229 | A * | 5/1964 | Johnson | F23R 3/04 60/748 |
| 3,581,492 | A * | 6/1971 | Norgren | F23R 3/06 60/804 |
| 4,301,657 | A * | 11/1981 | Penny | F23R 3/12 60/748 |
| 6,193,502 | B1 * | 2/2001 | Sudarev | F23D 14/22 239/132 |
| 6,260,359 | B1 | 7/2001 | Monty et al. | |
| 6,494,044 | B1 * | 12/2002 | Bland | F01D 9/023 60/772 |
| 7,059,133 | B2 | 6/2006 | Gerendas | |
| 7,747,222 | B2 | 7/2010 | Bernier et al. | |

(Continued)

*Primary Examiner* — Todd E Manahan
*Assistant Examiner* — David P. Olynick
(74) *Attorney, Agent, or Firm* — Venable LLP; Edward A. Kmett; Michele V. Frank (57) ABSTRACT

An apparatus and method for a combustor, the combustor including combustor liner having a plurality of dilution openings. The combustor receives a flow of fuel that is ignited and mixed with dilution air to form a flow of combustion gases. The flow of combustion gases travels through the combustor to a turbine section of an engine.

16 Claims, 5 Drawing Sheets

(56) References Cited

U.S. PATENT DOCUMENTS

| | | | |
|---|---|---|---|
| 7,891,194 B2* | 2/2011 | Biebel | F23R 3/06 60/752 |
| 8,281,600 B2* | 10/2012 | Chen | F02C 7/18 60/772 |
| 9,127,551 B2* | 9/2015 | Narcus | F01D 9/023 |
| 9,157,637 B2* | 10/2015 | Poyyapakkam | F23R 3/002 |
| 9,279,588 B2 | 3/2016 | Commaret et al. | |
| 9,291,350 B2 | 3/2016 | Melton et al. | |
| 9,599,342 B2 | 3/2017 | Leblond et al. | |
| 9,671,112 B2* | 6/2017 | Chila | F23R 3/286 |
| 2007/0227149 A1* | 10/2007 | Biebel | F23R 3/06 60/752 |
| 2013/0255265 A1* | 10/2013 | Rudrapatna | F23R 3/06 60/754 |
| 2015/0113994 A1* | 4/2015 | Hu | F23R 3/283 60/759 |
| 2015/0369068 A1 | 12/2015 | Kottilingam et al. | |
| 2016/0033129 A1* | 2/2016 | Burd | F23R 3/002 60/752 |
| 2016/0327272 A1* | 11/2016 | Sandoval | F23R 3/002 |
| 2016/0348912 A1* | 12/2016 | Lee | F23M 5/08 |
| 2017/0059162 A1 | 3/2017 | Papple et al. | |
| 2017/0363289 A1* | 12/2017 | Shim | F01D 9/023 |

\* cited by examiner

COMBUSTOR LINER DILUTION OPENING

BACKGROUND OF THE INVENTION

Turbine engines are driven by a flow of combustion gases passing through the engine onto a multitude of rotating turbine blades. A combustor can be provided within the turbine engine and is fluidly coupled with a turbine into which the combusted gases flow.

The use of hydrocarbon fuels in the combustor of a turbine engine is well known. Generally, air and fuel are fed to a combustion chamber where the fuel is burned in the presence of the air to produce hot gas. The hot gas is then fed to a turbine where it cools and expands to produce power. By-products of the fuel combustion typically include environmentally harmful toxins, such as nitrogen oxide and nitrogen dioxide (collectively called NON), CO, UHC (e.g., methane and volatile organic compounds that contribute to the formation of atmospheric ozone), and other oxides, including oxides of sulfur (e.g., $SO_2$ and $SO_3$).

Standards stemming from air pollution concerns worldwide regulate the emission of oxides of nitrogen ($NO_x$), unburned hydrocarbons (UHC), and carbon monoxide (CO) generated as a result of the turbine engine operation. In particular, nitrogen oxide ($NO_x$) is formed within the combustor as a result of high combustor flame temperatures during operation. It is desirable to decrease NOx emissions while still maintaining desirable efficiencies.

BRIEF DESCRIPTION OF THE INVENTION

In one aspect, the present disclosure relates to a combustor liner, the combustor liner comprising a monolithic wall at least partially defining a combustion chamber annular about a longitudinal axis, at least one dilution opening extending through the monolithic wall and defining an opening shape extending in an axial direction relative to the longitudinal axis, and at least one backside device projection extending outward from the monolithic wall along at least a portion of the opening shape to define at least a portion of an flow path that forms a dilution angle with the longitudinal axis.

In another aspect, the present disclosure relates to a method for controlling nitrogen oxides present in combustion gasses within a combustor, the method comprising injecting a dilution airflow into a combustion chamber through a dilution opening at an angle with respect to a longitudinal axis of the combustor and penetrating the combustion gasses with the dilution airflow to a depth of at least 30% of a dome height of the combustor.

In yet another aspect, the present disclosure relates to a method for controlling the nitrogen oxide present in combustion gasses within a combustor, the method comprising injecting a dilution airflow into a combustion chamber through a dilution opening having a backside device projection at a predetermined angle with respect to a longitudinal axis of the combustor, predicting the amount of nitrogen oxides present in the combustion chamber predicting a pattern factor at a turbine section fluidly coupled to the combustor and adjusting the predetermined angle such that a percentage decrease of nitrogen oxides is greater than or equal to a percentage increase in the pattern factor.

DETAILED DESCRIPTION OF THE INVENTION

Aspects of the disclosure described herein are directed to a combustor, and in particular a combustor liner having dilution holes. For purposes of illustration, the present disclosure will be described with respect to a turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
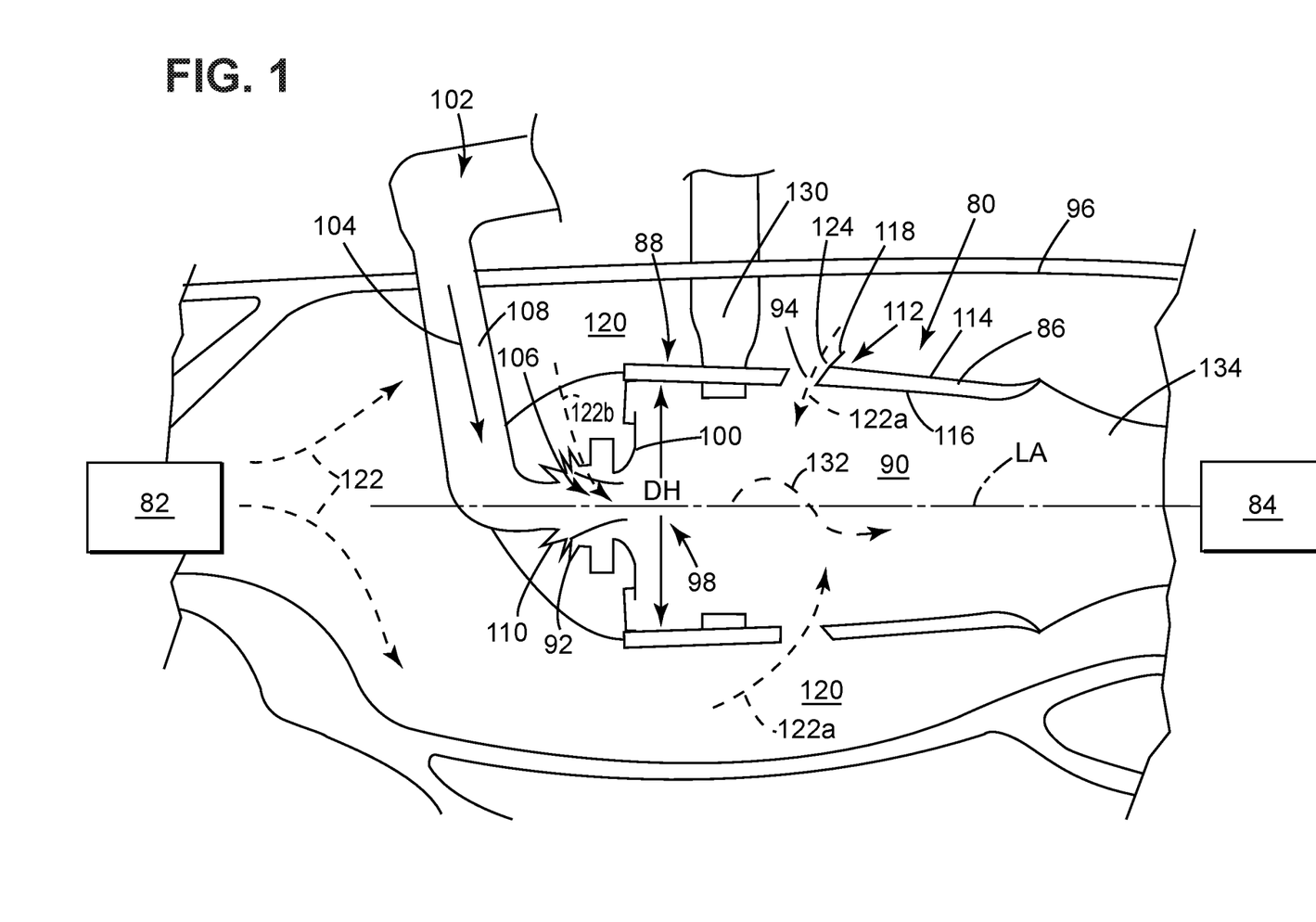
FIG. 1 is a cross-sectional view of a combustor for a turbine engine formed from a combustor liner having at least one dilution opening.

FIG. 1 depicts a cross-section view of a combustor 80. The combustor 80 can be part of an engine (not shown) and located between a compressor section 82 and a turbine section 84, each schematically illustrated. The combustor 80 can include an annular combustor liner 86 and a dome assembly 88 defining a combustion chamber 90 about a longitudinal axis (LA). At least one fuel injector 92 is fluidly coupled to the combustion chamber 90. A plurality of dilution openings 94 can be formed in the combustor liner 86. The combustor 80 can be disposed within a casing 96.

The at least one fuel injector 92 is coupled to and disposed within the dome assembly 88 at a dome inlet 98 comprising a flare cone 100. The dome inlet 98 defines a dome height (DH). The at least one fuel injector 92 includes a fuel inlet 102 that is adapted to receive a flow of fuel 104, a fuel outlet 106 that is in fluid communication with the combustion chamber 90, and a linear fuel passageway 108 extending therebetween. It should be appreciated that the at least one fuel injector 92 can be multiple fuel injectors and one or more of the fuel injectors 92 can have different characteristics and that the one fuel injector 92 shown is for illustrative purposes only and is not intended to be limiting. A swirler 110 can be provided at the dome inlet 98 to swirl incoming air in proximity to fuel 104 exiting the fuel injector 92 and provide a homogeneous mixture of air and fuel entering the combustor.

The combustor liner 86 can be defined by a monolithic wall 112 having an outer surface 114 and an inner surface 116 at least partially defining the combustion chamber 90. A backside device projection 118 can extend from at least one of the plurality of dilution openings 94 in the combustor liner 86. The backside device projection 118 extends as one continuous piece from the outer surface 114 along a backside, with respect to a flow of air 122, of the dilution opening 94 to define a portion of the monolithic wall 112. The monolithic wall 112 can be multiple monolithic portions assembled together to define the combustor liner 86. By way of non-limiting example, the outer surface 114 of the monolithic wall 112 can define a first piece while the inner surface 116 of the monolithic wall 112 can define a second piece that when assembled together form the combustor liner 86. As described herein, the monolithic wall 112 includes at least one of the dilution openings 94 and the backside device projection 118 formed as one single portion. It is further contemplated that the combustor liner 86 can be any type of combustor liner 86, including but not limited to a double walled liner or a tile liner, having a monolithic wall 112 where the backside device projection 118 extends as one continuous piece.

A compressed air passageway 120 is defined at least in part by both the outer surface 114 of the monolithic wall 112 and the casing 96. Compressed air 122 flows from the compressor section 82 to the combustor 80 through the compressed air passageway 120. The plurality of dilution openings 94 provided in the combustor liner 86 allow passage of at least a portion of the compressed air 122, forming a dilution airflow 122a from the compressed air passageway 120 to the combustion chamber 90. The backside device projection 118 defines a flow guide 124 along which the portion of dilution airflow 122a flows from the compressed air passageway 120 into the combustor 80.

Fuel 104 and a further portion of the compressed air 122b are supplied to the combustion chamber 90 via the dome inlet 98, and are then ignited within the combustion chamber 90 by one or more igniters 130 to thereby generate combustion gas 132. The remainder of compressed air 122 that does not go into the dome inlet 98 travels into the combustion chamber 90 via dilution airflow 122a or cooling air within the liner. The combustion gas 132 is mixed using compressed air 122 supplied through the plurality of dilution openings 94, and mixes within the combustion chamber 90, after which the combustion gas 132 flows through a combustor outlet 134 and exits into the turbine section 84.

Figure 2:
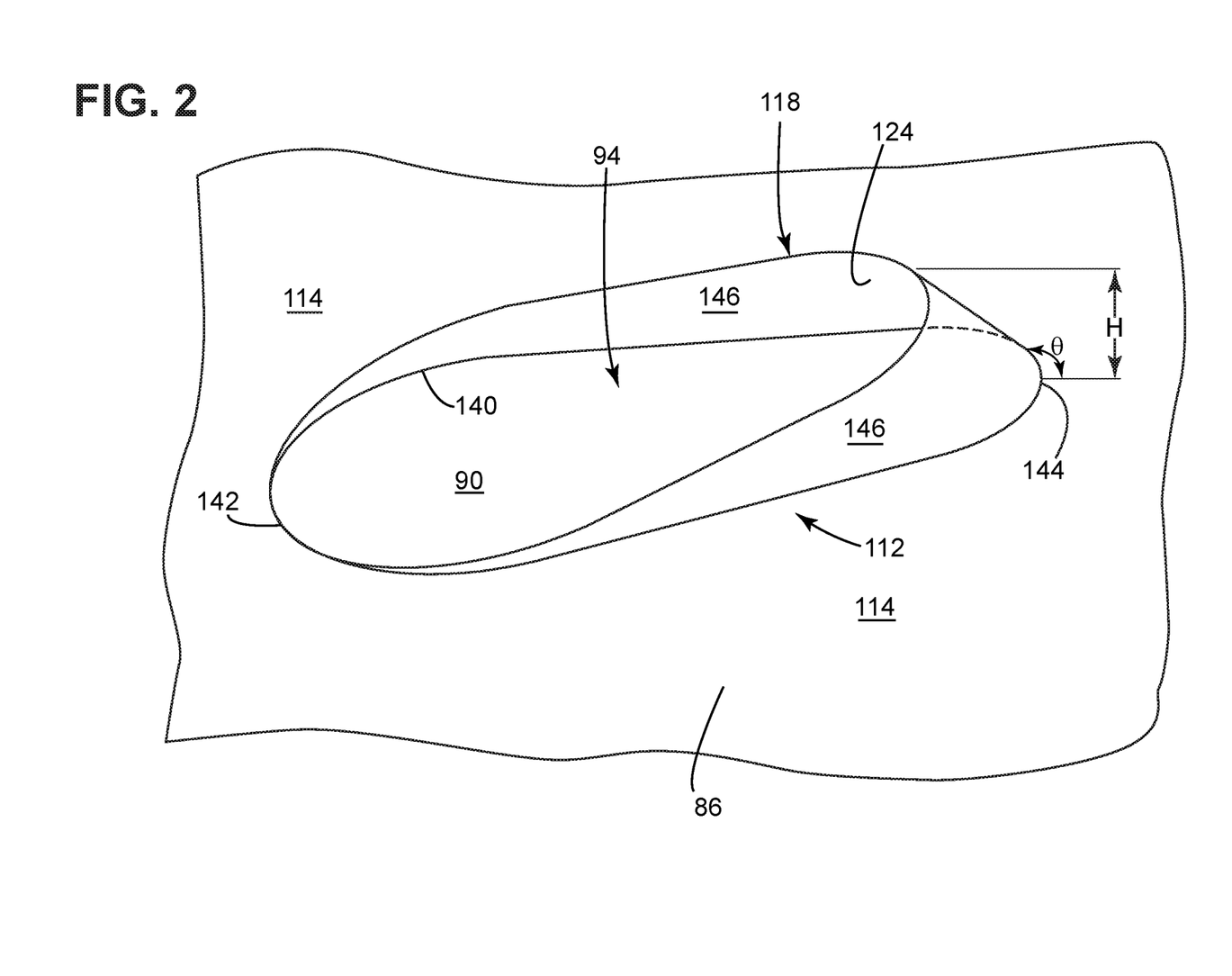
FIG. 2 is an enlarged isometric view of a dilution opening from FIG. 1 according to an aspect of the disclosure described herein.

An enlarged view of at least one of the dilution openings 94 is illustrated in FIG. 2. As shown, the dilution opening 94 can define a keyhole shape 140 extending in an axial direction from a leading edge 142 to a trailing edge 144. While illustrated as a keyhole shape, 140, it is contemplated that the dilution opening 94 can define any shape including but not limited to an oval, race track, tear drop, or airfoil shape. The backside device projection 118 can extend out from the outer surface 114 of the monolithic wall 112 along only a portion of the keyhole shape 140. As illustrated, the backside device projection 118 can define a projection wall 146 that extends out from the outer surface 114 a height (H) at the trailing edge 144 wherein the projection wall tapers from the trailing edge 144 towards the leading edge 142 such that the wall height (H) at the leading edge 142 is zero. The projection wall 146 can form a backside angle θ with the outer surface 114 at the trailing edge 144. The backside angle θ can range from 20° to 110°, and in some implementations from 30° to 100°.

Figure 3A:
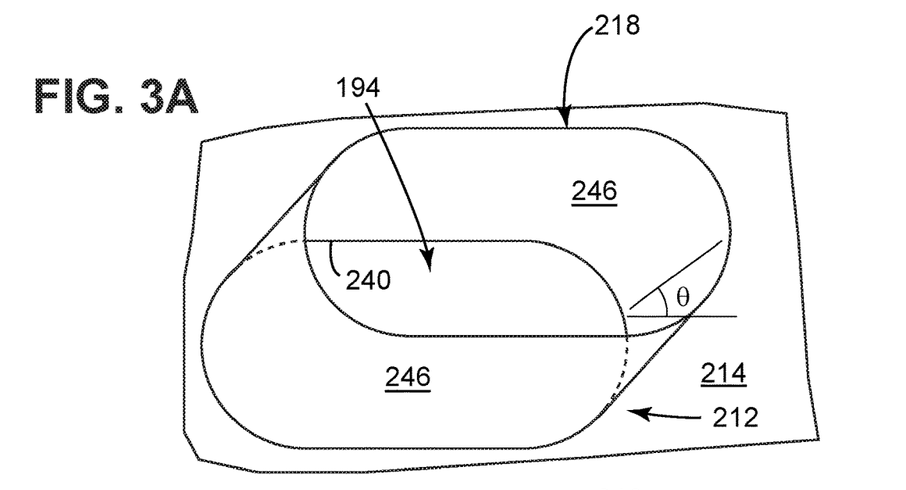
FIG. 3A is an enlarged isometric view of a dilution opening from FIG. 1 according to another aspect of the disclosure described herein.

FIG. 3A is an exemplary dilution opening 194 according to the disclosure discussed herein. The dilution opening 194 is substantially similar to the dilution opening 94 of FIG. 2. Therefore, like parts will be identified with like numerals increased by 100, with it being understood that the description of the like parts of the dilution opening 94 applies to the dilution opening 194 unless otherwise noted. Dilution opening 194 can define an oval shape 240 around which a projection wall 246 extends to form a portion of a monolithic wall 212. The projection wall 246 can extend from the entirety of the dilution opening 194 at an outer surface of the monolithic wall 212. It is contemplated that the projection wall 246 is oriented at a backside angle θ to define a backside device projection 218. The backside device projection 218 can extend out from an outer surface 214 of the monolithic wall 212 along only a portion of the oval shape 240.

Figure 3B:
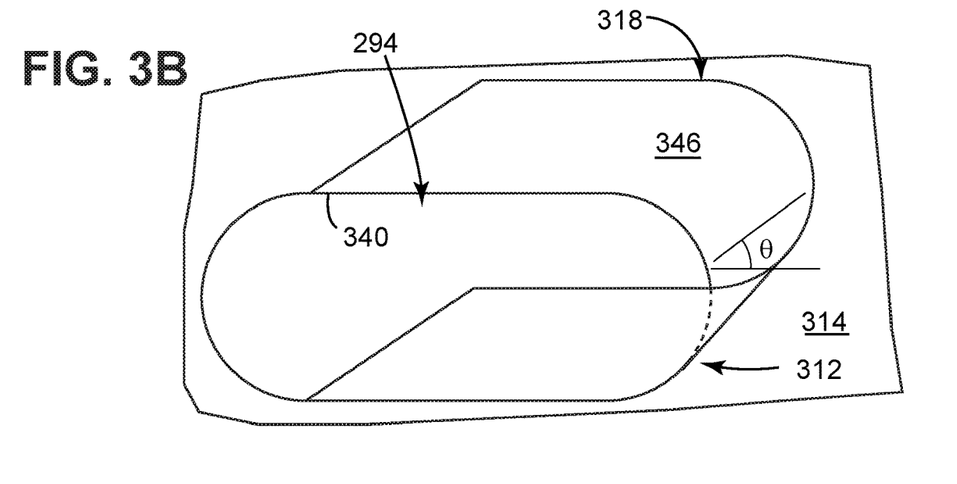
FIG. 3B is an enlarged isometric view of a dilution opening from FIG. 1 according to another aspect of the disclosure described herein.

FIG. 3B is another exemplary dilution opening 294 according to the disclosure discussed herein. The dilution opening 294 is substantially similar to the dilution opening 94 of FIG. 2. Therefore, like parts will be identified with like numerals increased by 200, with it being understood that the description of the like parts of the dilution opening 94 applies to the dilution opening 294 unless otherwise noted. Dilution opening 294 can define a race track shape 340 around which a projection wall 346 extends to form a portion of a monolithic wall 312. It is contemplated that the projection wall 346 is oriented at a backside angle θ to define a backside device projection 318. The backside device projection 318 can extend out from an outer surface 314 of the monolithic wall 312 along only a portion of the race track shape 340. While illustrated as a partial wall similar to projection wall 146, it should be understood that the projection wall 346 can circumscribe any amount of the dilution opening 294 including the entire opening like projection wall 246.

Figure 3C:
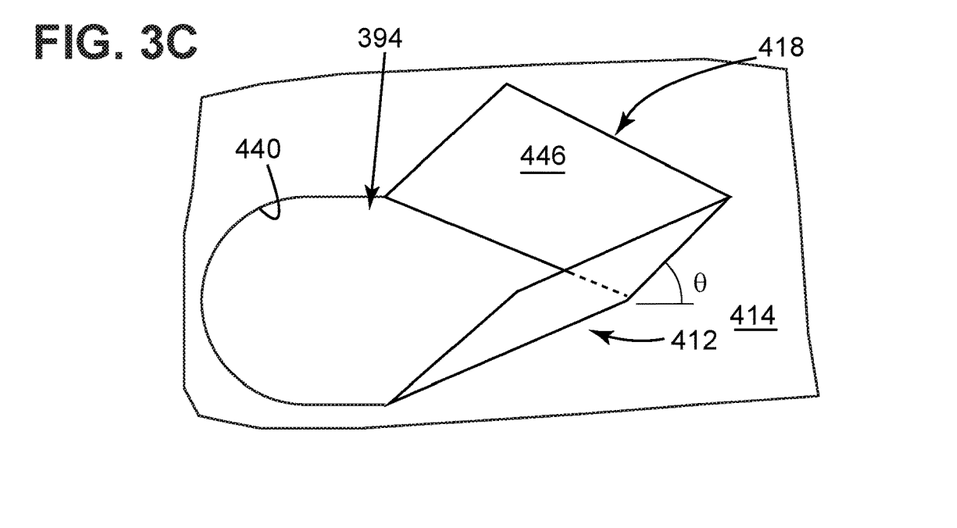
FIG. 3C is an enlarged isometric view of a dilution opening from FIG. 1 according to yet another aspect of the disclosure described herein.

FIG. 3C is yet another exemplary dilution opening 394 according to the disclosure discussed herein. The dilution opening 394 is substantially similar to the dilution opening 94 of FIG. 2. Therefore, like parts will be identified with like numerals increased by 300, with it being understood that the description of the like parts of the dilution opening 94 applies to the dilution opening 394 unless otherwise noted. Dilution opening 394 can define a tear drop shape 440 around which a projection wall 446 extends to form a portion of a monolithic wall 412. It is contemplated that the projection wall 446 is oriented at a backside angle θ to define a backside device projection 418. The backside device projection 418 can extend out from an outer surface 414 of the monolithic wall 312 along only a portion of the tear drop shape 440. While illustrated as a partial wall similar to projection wall 146, it should be understood that the projection wall 446 can circumscribe any amount of the dilution opening 394 including the entire opening like projection wall 246.

Any combination of dilution opening shape and projection wall height to form the backside device projection is contemplated. Each backside device projection and dilution opening contemplated is formed as a single piece as part of a monolithic wall as described herein. It should be understood that the angle at which the projection wall extends at and the height to which the projection wall extends can also vary. FIGS. 2, 3A, 3B, and 3C are for illustrative purposes only and not meant to be limiting.

It should be appreciated that the dilution opening 94 is exemplary as illustrated. The dilution opening 94 can be organized in a myriad of different ways, and can include by way of non-limiting example ribs, pin banks, circuits, sub-circuits, film-holes, plenums, mesh, and turbulators, of any shape or size. The dilution opening 94 can include other flow enhancing devices, by way of non-limiting example a small hole located behind the dilution opening 94. It is further contemplated that the dilution opening 94 can be part of a collection of dilution openings 94. It is also contemplated that the dilution openings 94 can be in addition to and separate from a collection of cooling holes located along the combustor liner 86.

Figure 4A:
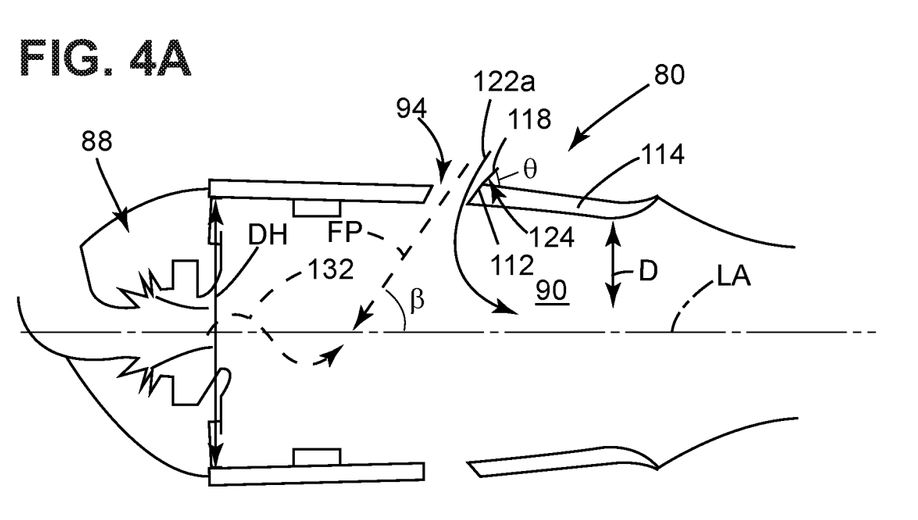
FIG. 4A is a cross-sectional view of the combustor from FIG. 1 according to another aspect of the disclosure described herein.

Turning to FIG. 4A, a cross-section of the combustor 80 is illustrated. For clarity, some part numbers have been omitted. The backside angle θ at which the backside device projection 118 is oriented to define a flow path (FP) along the flow guide 124 is illustrated with respect to the outer surface 114 of the monolithic wall 112. The flow path (FP) can be extended to intersect the longitudinal axis (LA) and define a dilution angle β. It is contemplated that the backside angle θ is equal to the dilution angle β. It is further contemplated that the backside angle θ is greater than or less than the dilution angle β depending on the flow of dilution airflow 122a along the flow path (FP) and the geometry and orientation of the combustor 80. The dilution angle β ranges from 30 degrees to 100 degrees.

By way of non-limiting example, the dilution angle β is 30 degrees in FIG. 4A. It is contemplated that when the flow path (FP) extends to intersect the longitudinal axis at the dilution angle β of 30 degrees, penetration of the dilution airflow 122a within the combustion chamber 90 can reach to a depth (D) of at least 30% the dome height (DH).

A method for controlling nitrogen oxides, or $NO_x$ present in combustion gases 132 within the combustor 80, includes injecting the dilution airflow 122a into the combustion chamber 90 through the dilution opening 94 at an angle β with respect to the longitudinal axis (LA) of the combustor 80. The method further includes penetrating the combustion gases 132 with the dilution airflow 122a to a depth of at least 30% the dome height (DH) of the combustor 80.

Figure 4B:
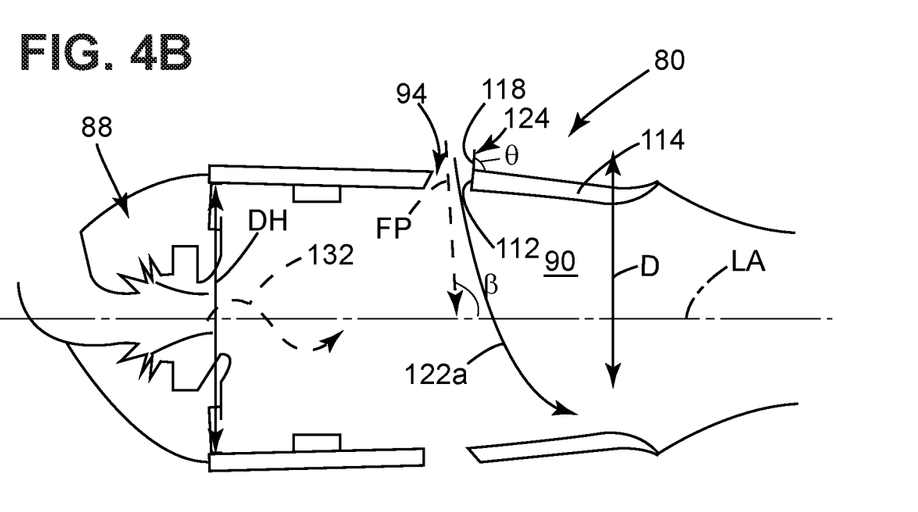
FIG. 4B is a cross-sectional view of the combustor from FIG. 1 according to yet another aspect of the disclosure described herein.

It is further contemplated that when the dilution angle β is 100 degrees as illustrated in FIG. 4B, penetration of the dilution airflow 122a within the combustion chamber 90 can reach to a depth (D) of at least 70% the dome height (DH). It is further contemplated that a larger angle, by way of non-limiting example when the dilution angle β is 100 degrees, can enable the dilution airflow 122a to reach a full depth of the combustion chamber 90, or 100% of the dome height (DH). The method as described herein can further include penetrating the combustion gases 132 with dilution airflow 122a to a depth of at least 70% the dome height of the combustor 80. And further to completely penetrate the combustor 80 to a full depth of 100%.

It is further contemplated that the method as described herein can include reducing a wake temperature at the trailing edge 144 of the dilution opening. The reduction in wake temperature at the trailing edge can be greater than or equal to 100° F.

Additive manufacturing enables combining a unique dilution opening shape, by way of non-limiting example an airfoil shape, keyhole shape 140, oval shape 240, race track shape 340, or tear drop shape 440 with a unique backside devices projection shape, as described herein, to provide an optimal dilution penetration and therefore an optimal quench.

Figure 5:
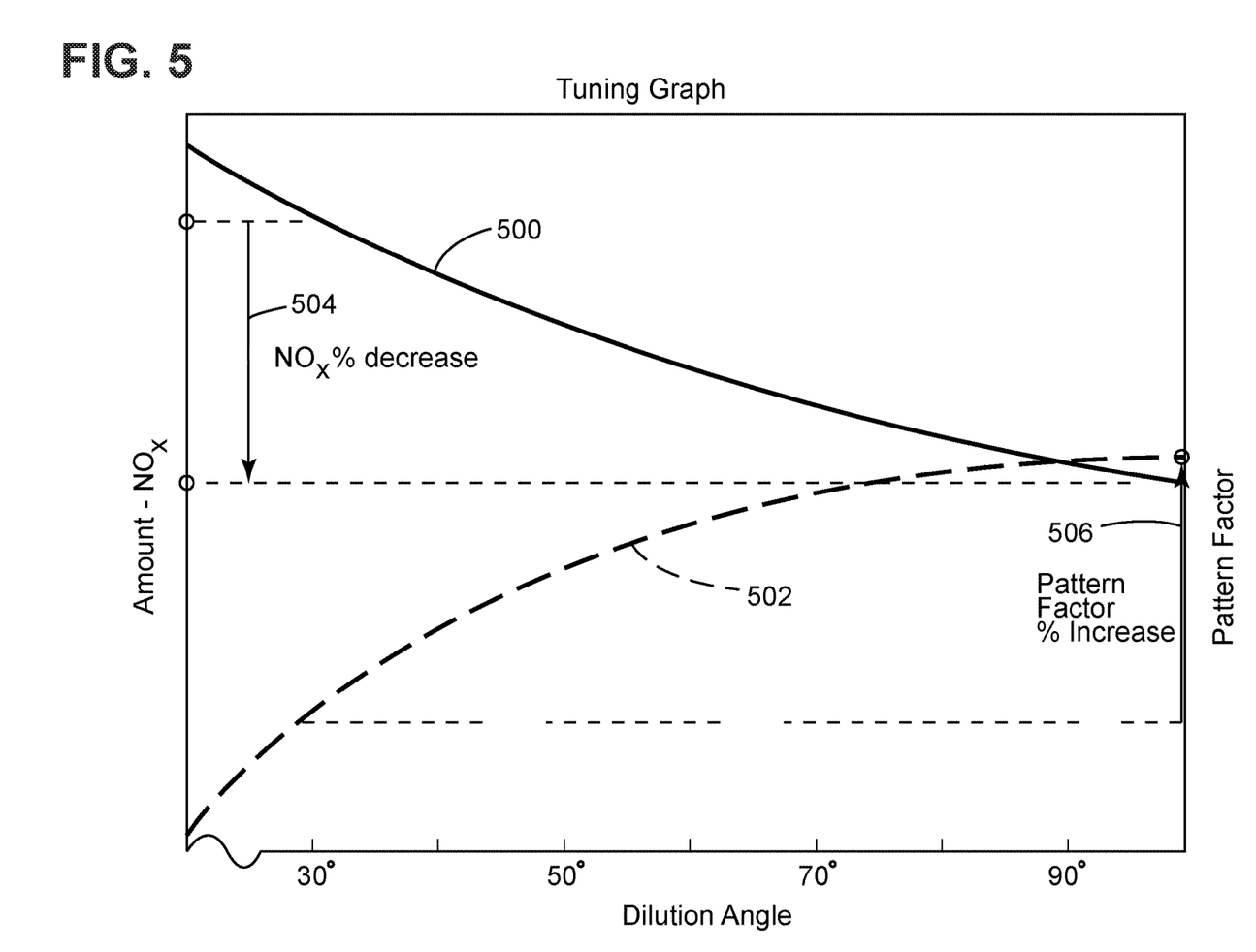
FIG. 5 is a tuning graph depicting the change in NOx amount and a Pattern Factor as a dilution angle for the dilution opening of FIG. 4A changes.

Turning to FIG. 5, a tuning graph illustrates an amount of NOx emission present 500 in the combustion chamber 90. The amount of NOx present 500 can be an arbitrary amount represented on the left y-axis. Though arbitrary, the amount is well known for the baseline condition from combustor rig tests at full power engine conditions. The dilution openings as described herein provide a dilution airflow into the combustion chamber 90 in order to quench $NO_x$ emissions. The effectiveness of the quench, provided by dilution openings as described herein, is a key aspect of controlling $NO_x$ emissions. As the dilution angle β described herein increases, the amount of $NO_x$ emission present 500 decreases as illustrated on the tuning graph. $NO_x$ decrease occurs with a changing dilution angle, because a primary zone fuel-to-air ratio is increasing as less dilution air is entrained in the primary zone located between the dome inlet 98 and the dilution opening 94.

Also illustrated along the right y-axis of the tuning graph is a pattern factor amount 502. The pattern factor amount 502 as described herein refers to a ratio of temperatures, in particular $$\frac{T_{max\ exit} - T_{avg\ exit}}{T_{avg\ exit} - T_{IN\ LET}}$$

where $T_{max\ exit}$ is the maximum temperature of the combustion gases leaving the combustor, $T_{avg\ exit}$ is the average of the temperature of the combustion gases leaving the combustor, and $T_{INLET}$ is the temperature of the gases when received at the turbine section 84. It is beneficial for the pattern factor amount 502 to be as close to 1 as possible, or at the x-axis on the tuning graph. As the dilution angle β described herein increases, the pattern factor also increases.

A method for controlling the NOx present 500 in combustion gases 132 within the combustor 80, includes injecting the dilution airflow 122a into the combustion chamber 90 through the dilution opening 94 along the backside device projection 118 at a predetermined angle β, the dilution angle β as described herein, with respect to a longitudinal axis (LA) of the combustor 80. The method further includes predicting the amount of $NO_x$ present 500 in the combustion chamber. The method also includes predicting the pattern factor amount 502 at the turbine section 84 fluidly coupled to the combustor 80. The method can further include predicting an inlet temperature, an average temperature, and an exit temperature to calculate the pattern factor. The dilution angle β influences the pattern factor amount 502 by changing how much of the reaction gets quenched versus how much gets passed a dilution area proximate the dilution opening 94 to create hot streaks toward the back of the combustor. Hot streaks drive pattern factor. The amount of $NO_x$ present 500 is also affected by how much compressed air 122b is directed into the primary zone, since $NO_x$ is a strong function of primary zone fuel-air-ratio. Upon predicting the NOx present 500 and the pattern factor amount 502, the predetermined angle β is adjusted such that a percentage decrease of $NO_x$ 504 is greater than or equal to a percentage increase of the pattern factor 506. By way of non-limiting example, the amount of $NO_x$ present decreases by 30%, and the pattern factor increases by 15%. The percentage decrease of $NO_x$ 504 can be, by way of non-limiting example, greater than or equal to up to three times a percentage increase of the pattern factor 506. The method as described herein can further include adjusting the predetermined angle to an angle greater than 50 degrees. The amount of tuning, or decrease in $NO_x$ emission with an increase in pattern factor ratio is dependent upon the engine in which the backside device projection is located along a dilution opening.

Benefits associated with the combustor liner and methods described herein are enabled by additive manufacturing. Additive manufacturing of combustor liners enables an almost unlimited range of both dilution opening shapes and backside device projections, which when combined and printed directly into the part to form a monolithic wall can provide optimized dilution quench and therefore optimum $NO_x$ emissions. The methods described herein relate to both the penetration of the dilution airflow and the tuning of the dilution opening with backside device projections to optimize the $NO_x$ emission while maintaining a known or acceptable pattern factor.

While described with respect to a turbine engine, it should be appreciated that the combustor as described herein can be for any engine with a having a combustor that emits $NO_x$. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A combustor liner, the combustor liner comprising:
   a wall having an outer surface and an inner surface and at least partially defining a combustion chamber about a longitudinal axis,
   wherein the outer surface is radially outward of the inner surface relative to the longitudinal axis;
   at least one dilution opening extending through the wall and defining an opening shape extending in an axial direction relative to the longitudinal axis; and
   at least one backside device projection extending outward from the wall as one continuous piece along a portion of the opening shape and defining a projection wall extending out from the outer surface of the wall a wall height, and leaving a remaining portion of the opening shape free of the at least one backside device projection, to define at least a portion of a flow path that forms a dilution angle with the longitudinal axis;
   wherein the projection wall includes a base connected at the outer surface, a tip opposite the base, and a first side positioned facing the dilution opening,
   wherein the projection wall is configured to direct a flow of air into the dilution opening, wherein the base is disposed at a trailing edge of the dilution opening, and the projection wall is arranged such that the tip is disposed in an aft direction relative to the base, and
   wherein a portion of the outer surface of the wall downstream of the trailing edge of the opening shape forms a backside angle with the first side of the projection wall along an entirety of the wall height that is an acute angle less than 90 degrees.

2. The combustor liner of claim 1, wherein the opening shape is a keyhole shape.

3. The combustor liner of claim 1, wherein the opening shape is an oval shape.

4. The combustor liner of claim 1, wherein the opening shape is a tear drop shape.

5. The combustor liner of claim 1, wherein the opening shape is a race track shape.

6. The combustor liner of claim 1 wherein the dilution angle is greater than or equal to 30 degrees.

7. The combustor liner of claim 2, wherein the opening shape further comprises a leading edge and extends in the axial direction from the leading edge to the trailing edge.

8. The combustor liner of claim 7, wherein the remaining portion of the dilution opening is located along the leading edge.

9. The combustor liner of claim 7 wherein the projection wall tapers from the trailing edge toward the leading edge such that the wall height at the leading edge is zero.

10. The combustor liner of claim 7 wherein the backside angle is equal to the dilution angle.

11. The combustor liner of claim 10, wherein the dilution angle is greater than or equal to 30 degrees.

12. The combustor liner of claim 1 wherein the opening shape is one of an oval shape, tear drop shape, race track shape, or airfoil shape.

13. The combustor liner of claim 1 wherein the combustion chamber extends along the longitudinal axis from a dome assembly defining a dome height.

14. The combustor liner of claim 13, wherein the flow path extends into the combustion chamber to a depth of at least 30% of the dome height.

15. The combustor liner of claim 13, wherein the flow path extends into the combustion chamber to a depth of at least 70% of the dome height.

16. The combustor liner of claim 13, wherein the flow path extends into the combustion chamber to a depth of 100% of the dome height.

\* \* \* \* \*